United States Patent Office 3,666,633
Patented May 30, 1972

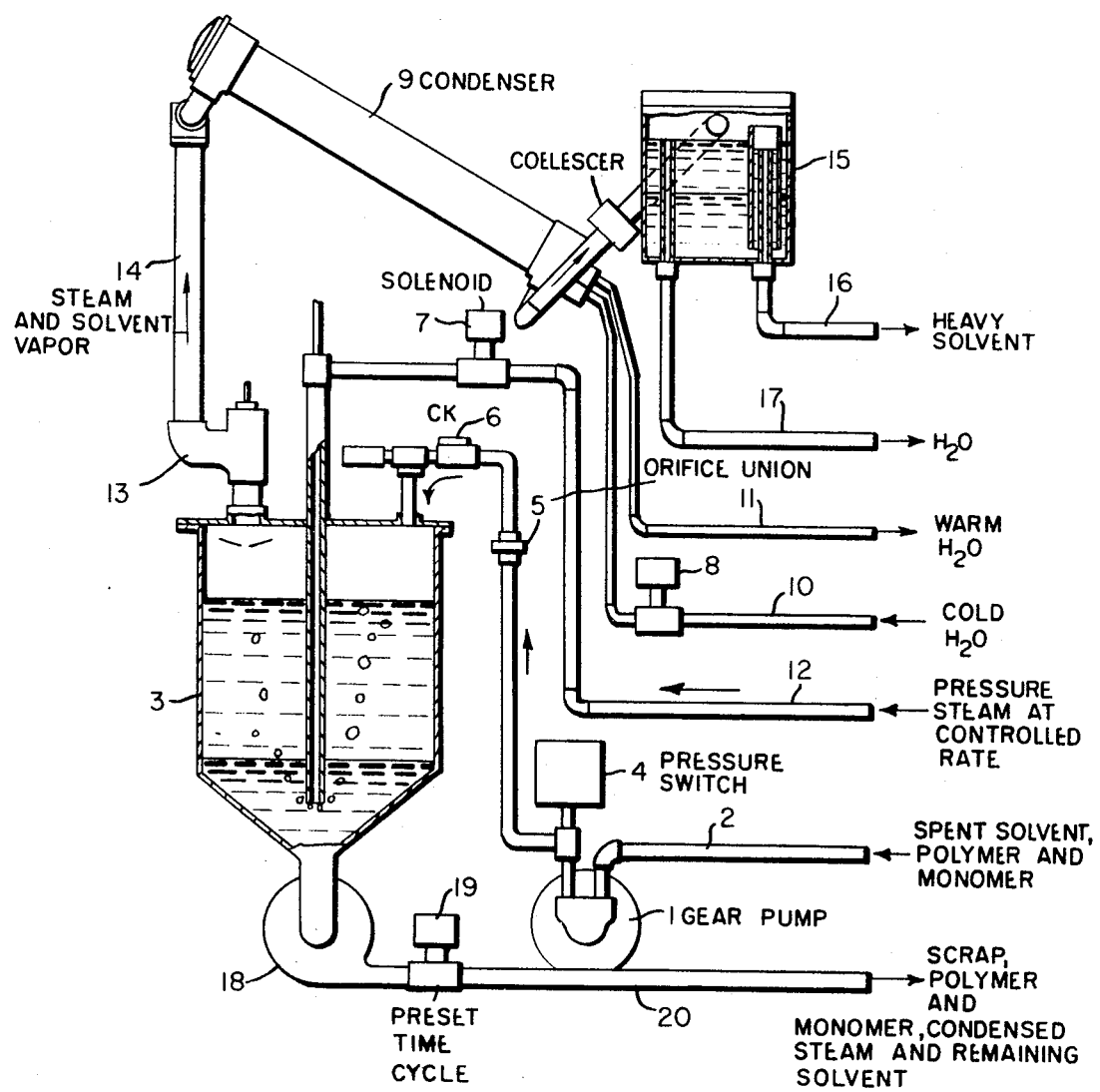

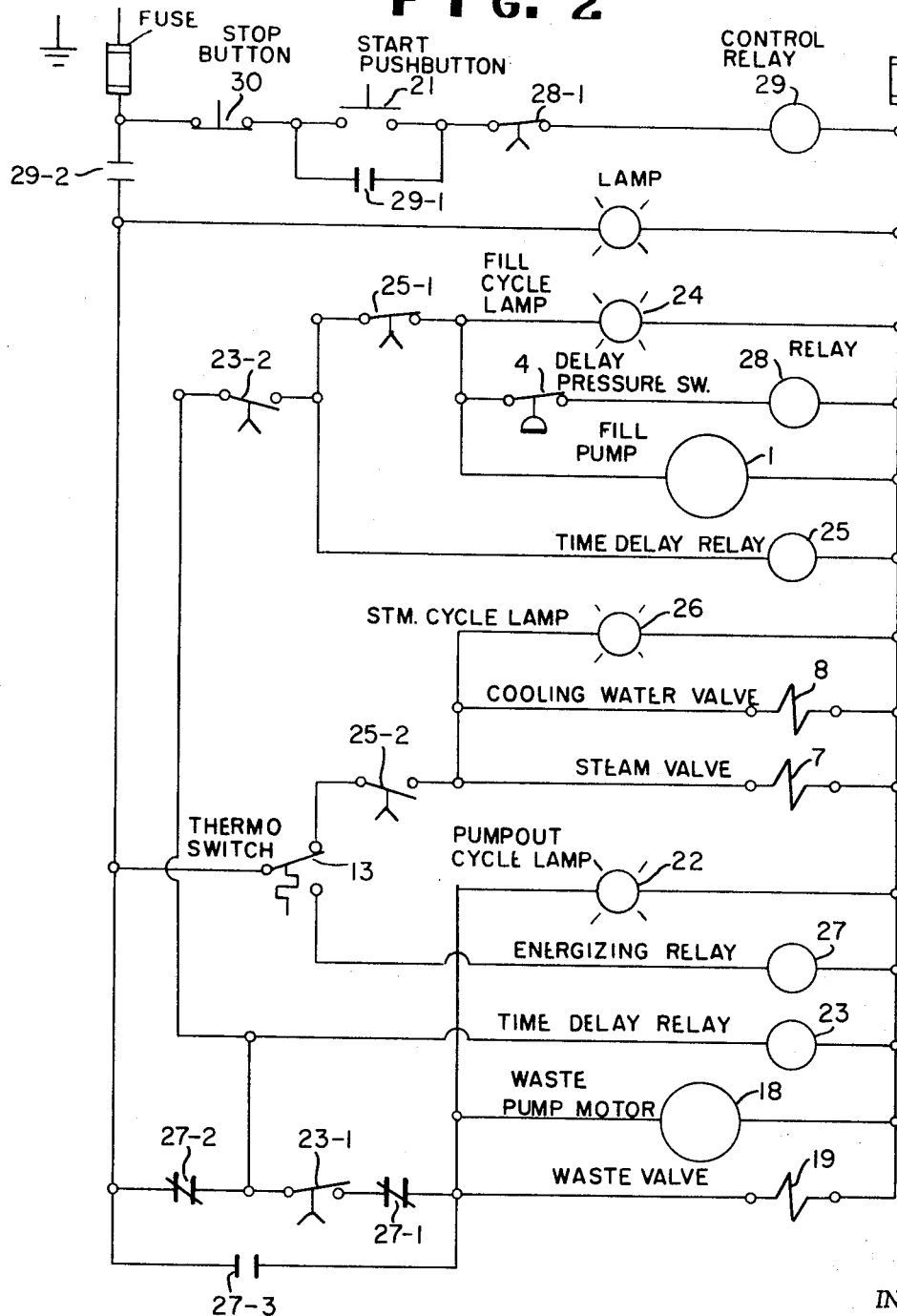

3,666,633
RECOVERY OF CHLORINATED ALKANE SOLVENT
Andrew Michael Essex, Bridge City, Tex., and Robert Bernard Heiart, Middletown, N.J., assignors to E. I. du Pont de Nemours and Company, Wilmington, Del.
Filed Oct. 28, 1969, Ser. No. 871,970
Int. Cl. B01d *1/14, 3/00, 3/34*
U.S. Cl. 203—95
7 Claims

ABSTRACT OF THE DISCLOSURE

An apparatus for recovery of organic solvents at least partially immiscible with water from mixtures, the apparatus having (a) a vessel free from heating surfaces, (b) means for supplying steam into the vessel, (c) exit means for the steam and solvent, (d) condenser for steam and solvent, and (e) a decanter for separating water and solvent; the apparatus having electrical means for automatically and sequentially supplying the mixture, injecting steam into the mixture, and ending the injection upon maximum solvent recovery, as indicated by temperature above the vessel.

Process for recovery of organic solvents from such mixtures by passing steam therethrough, condensing steam and solvent, separating water and solvent by decantation, discharging waste products and repeating the cycle, whereby solvent cleans the apparatus. The apparatus and process are useful for recovering solvents from photopolymerizable materials containing ethylenically unsaturated monomers and macromolecular polymers.

BACKGROUND OF THE INVENTION

This invention relates to solvent recovery apparatus and systems and more particularly to the recovery of polymer- and/or monomer-laden organic solvents without the use of solid heating surfaces. Still more particularly, this invention relates to the recovery of polymer- and/or monomer-laden organic solvents using a repetitive batch process in which the solutions do not come in contact with solid heating surfaces other than surfaces of the steam injector.

In various photoresist-making processes, after imagewise-exposure of a solid photosensitive layer comprising a macromolecular organic polymer, the resist-forming element is placed in an organic solvent developer and the areas of the element which are soluble after exposure are dissolved in the solvent, leaving a polymeric image upon the element.

Frequently, a volatile halogenated hydrocarbon solvent, e.g., methyl chloroform or methylene chloride, is used as the developing agent or solvent. After development the solvent contains dissolved polymer and monomer. If no means are available to purify the spent solvent, it must be disposed of. It is thus economically desirable to have a way of recovering the solvent so that it may be used over again. The problem incurred by conventional distillation recovery systems when applied to solvents containing dissolved polymer and/or monomer is caking or solidification and buildup of the scrap polymer on the working parts and particularly the heating surfaces as the solvents are distilled. This fouling precludes efficient recovery, since a cleaning step or steps must be employed to ready the recovery apparatus for further use. Furthermore, high temperatures within the cake can produce products corrosive to the heating surfaces and a formation of toxic products. The problem results from the use of solid heating surfaces; that is, the necessary heat imparted to the system to effect distillation of the solvent from the dissolved polymer and monomer impurities is supplied directly through solid surfaces in contact with the solution to be purified. As the solvent is driven off, the residue solidifies and congeals on the heated surfaces. If monomeric materials are present, heating might cause crosslinking of them and they would not then be removable by introduction of new solvent.

SUMMARY OF THE INVENTION

It is therefore the object of this invention to provide a unique process and apparatus for the recovery of polymer- and/or monomer-laden organic solvents which permits maximum recovery of the solvent without the buildup of the impurities on the distillation equipment. The process comprises passing steam directly through a batch of spent solvent, condensing the mixture of steam and pure solvent which is given off, and separating the water and solvent in a decanter. The cycle is then repeated by drawing off the polymer- and/or monomer-laden residue together with condensed steam and injecting another batch of spent solvent which in turn dissolves any solid residue left over from the first batch.

The apparatus for carrying out this process comprises a container for holding the spent solvent, a steam source, a condenser, a separation decanter, means for drawing off the polymer- and monomer-laden residue after each batch of solvent is processed, means for injecting additional spent solvent into the container, and electrical means for automating the entire apparatus.

The process and apparatus eliminates fouling of the working parts due to the buildup of residue in two ways. First, no solid heating surfaces are used, which minimizes the tendency of the polymer and monomer to solidify on those surfaces. A slight buildup occurs initially on the pipe conveying the steam into the container; but this is limited since the residue itself gradually becomes a heat insulator and no more buildup can occur. Second, the use of a batch process determines that any residue left after a given batch of solvent is purified will be dissolved by the next batch of spent solvent introduced into the container.

This invention allows recovery of 80 to 98% of the spent solvent. The manner in which this occurs will become clear in the following description of a preferred embodiment of the apparatus.

DESCRIPTION OF THE DRAWING

The apparatus of the invention is described in the drawings, wherein
FIG. 1 is a view in elevation, with parts in section, of the apparatus.
FIG. 2 is a diagram of a suitable electrical control circuit for the apparatus.

DESCRIPTION OF THE PREFERRED EMBODIMENT

Referring to the preferred embodiment of the apparatus, as shown in FIG. 1, the process is begun with the activation of a positive displacement gear pump 1 which draws in the spent solvent with dissolved polymer and monomer from an outside source through pipe 2. Pump 1 forces the solvent into the container 3 for a pre-set time based on the amount of solvent which vessel or container 3 is designed to hold. For example, if the container 3 is to be charged to five gallons, pump 1 could introduce the solvent at a rate of 2½ gallons per minute for two minutes. The entrance line 2 is equipped with a pressure switch 4 and an orifice union 5 which provides for automatic stopping of the system if no liquid pressure is detected for 5 seconds during the "fill cycle." The solvent passes through a check valve 6 which prevents back flow of the solvent when steam is entering the container 3. At the end of the present filling time, pump 1 automatically stops and the "fill cycle" is over. At that instant, solenoid valves 7 and 8 open. Water flows through valve 8 from pipe 10 through the shell- and tube-type condenser 9 and out of pipe 11 in order to cool the condenser and liquefy the vapor that will be entering it. Valve 7 admits steam from pipe 12 under pressure at a controlled flow rate. The steam is bubbled through the solvent and after a few minutes distillation begins. A thermo-switch 13 senses the rise in temperature as the distillation proceeds. The distillation temperature is less than 100° C. and gradually climbs as the steam to solvent ratio increases during distillation. The non-volatile impurities are left behind in the container 3. The mixture of steam and solvent vapor travels up pipe 14 and into condenser 9. There it liquefies. The liquefied mixture then travels to the decanter 15 where the heavier liquid is separated by gravity from the lighter liquid and is drained through and collected from pipe 16. The water is drained through pipe 17. It can be determined experimentally at what temperature, detected by the temperature switch 13, optimum recovery of the solvent is obtained. For example, using methyl chloroform as the solvent to be recovered, 90% of the solvent will have been distilled and recovered when the vapor temperature at the thermo switch 13 reaches 70° C. At this point, the temperature switch 13 closes valves 7 and 8 thus ending the "steam" or distillation cycle," and activates a centrifugal pump 18 and opens solenoid valve 19. Pump 18 sucks out the scrap polymer and monomer left behind in the container 3 after distillation along with the condensed steam and the remaining amount of solvent. The waste leaves through pipe 20. The pump 18 operates on a preset time cycle, then stops. Solenoid valve 19 closes. At this point, the gear pump 1 is activated and another batch of spent solvent is introduced into container 3 and the process begins again as just described. The new batch of solvent dissolves any scrap polymer and monomer which the pump 18 was not able to remove. Thus all working parts remain clean throughout recovery and the apparatus may be used continuously without fear of gumming or fouling by residue buildup. When the parameters of operation have been settled upon, the apparatus works on its own normal cycle without manual intervention.

Referring to FIG. 2, the electrical sequence of operation will now be described from the standpoint of starting up the apparatus from an inactive state. The control panel consists of two pushbuttons: start and stop. When the "start" pushbutton 21 is pressed, the waste pump motor 18 starts. The "pump out cycle" lamp 22 and time delay relay 23 are energized. The container 3 is emptied and after a preset time delay, relay (23) times out, relay contact 23–1 opens thus shutting the waste solenoid valve 19, turning off the waste pump 18 and de-energizing the "pump out cycle" lamp 22, and relay contact 23–2 closes thus starting the fill pump 1 and energizing the "fill cycle" lamp 24 and time delay relay 25. After the preset time delay, dependent upon the amount to which the container is to be filled and the fill rate, has elapsed, the container is filled and relay 25 times out. Relay contact 25–1 opens, shutting off the fill pump 1 and the "fill cycle" lamp 24. Relay contact 25–2 closes, the steam valve 7 opens admitting steam into the container, the cooling water valve 8 opens to allow cooling water to go to the condenser, and the "steam cycle" lamp 26 goes on. As the distillation proceeds and the temperature reaches the point which indicates optimum solvent recovery, the thermo switch 13 opens the "steam cycle" circuit thus shutting off valves 7 and 8 and the "steam cycle" lamp 26, and closes the "pump out cycle" circuit, thus energizing relay 27. The "pump out cycle" lamp 22 and waste valve 19 are energized. The waste pump motor 18 starts through relay contact 27–3. As the temperature decreases, the thermo switch 13 resets, de-energizing relay 27. Relay contacts 27–1 and 27–2 close, lamp 22 and valve 19 are still energized and pump 18 continues to run. Relay 23 energizes. After the preset time for removal of the waste, relay 23 times out as before and the "fill cycle" starts as described above.

An automatic stop is provided by pressure switch 4 as before described. If no liquid pressure is detected for 5 seconds by switch 4 during the "fill cycle," relay 28 times out and relay contact 28–1 opens. The master control relay 29 is de-energized and relay contacts 29–1 and 29–2 open. Power to the machine is cut.

To stop the machine manually, button 30 is pressed. Relay 29 is de-energized and relay contacts 29–1 and 29–2 open. Power to the machine is cut.

This process and apparatus can be used to purify and recover any solvent which is at least partially immiscible with water. The process of the invention is useful in recovering methyl chloroform, methylene chloride and trichloroethylene. The spent solvent generally contains 0.1% to 10% polymer composition by weight. During the "steam" or "distillation cycle," the vapors given off are mostly solvent and a relatively small amount of steam by volume. Thus the process is extremely efficient. Separation of the liquified water and solvent can be made more complete by the addition of a liquid coalescer between condenser 9 and the decanter 15. This increases the size of the droplets of the internal phase going into the decanter 15 and thus aids separation.

A specific example of how this process is used follows. Referring to Example I of Cleste, U.S. Pat. 3,469,982, Sept. 30, 1969, a photoresist coating of the composition described in that example was laminated to a copper clad, epoxy-Fiberglas® board. The laminate was then imagewise-exposed as described in the above example, producing soluble and insoluble areas in the photoresist film coating. The board was then developed as described in the above example, except that methyl chloroform was used as a solvent instead of trichloroethylene. The unexposed, soluble areas of the photoresist film were dissolved in the methyl chloroform and washed from the board leaving the insoluble resist image on it. The methyl chloroform containing the dissolved photoresist, was then purified and recovered using the process and apparatus of this invention in the following manner. The gear pump 1 drew in the spent methyl chloroform and charged the container 3 at a rate of 2.5 gallons per minute. The desired amount of solvent in container 3 was 5 gallons, thus time delay relay 25 was set to time out in two minutes, ending the "fill cycle." As described above, the "steam cycle" automatically begins. Steam was introduced into the solvent in container 3 at the rate of about 30 lbs. per hour. After approximately 23 minutes, the vapor temperature as detected by the thermo switch 13 had risen from 67° C. to 70° C., the point at which optimum recovery of solvent was obtained. The switch 13 automatically turned off the steam and ended the "steam cycle." The "pump out cycle" began. Pump 18 drew out the residual polymer-monomer mixture and steam condensate. Time delay relay 23 had been set for 35 seconds. When it timed out, the pump 18 stopped, ending the "pump out cycle." The next batch of spent solvent was then introduced by pump 1 into container 3, dissolving any scrap that pump 18 had not emptied and thus cleaning the apparatus as well. The process went on as before. The recovery and purification of the methyl chloroform was 88%; i.e., 88% of the spent solvent was purified.

All mechanical parts of the apparatus are preferably made of stainless steel to prevent corrosion. If no corrosion problem presents itself, other materials, such as bronze, would suffice. This, however, depends on the type of solvent used.

The process is useful in recovering volatile organic solvents which are at least partially immiscible with water, from photopolymerizable compositions from relief-forming elements of the types described in the following U.S. Pats.: Plambeck 2,760,863, May 7, 1956; Burg and Cohen 3,060,022, 3,060,023, Oct. 23, 1962, which contain an ethylenically unsaturated monomer and a macromolecular organic polymer binding agent, as described in said patents, and from other mixtures which contain materials that form polymeric deposits on heated surfaces.

The embodiments of the invention in which an exclusive property or privilege is claimed are defined as follows:

1. A process for the recovery of a volatile chlorinated alkane solvent, the solvent being at least partially immiscible with water from a mixture of the solvent containing substantial amounts of material which can form polymeric deposits on heated surfaces, characterized in that steam is passed through the mixture, the evolved steam and solvent are condensed, the water is decanted from the condensate, and the material and polymer are removed periodically from the lower part of the solvent mixture.

2. A process according to claim 1, wherein said material is a mixture of a non-gaseous ethylenically unsaturated monomer and a macromolecular organic polymer having a molecular weight in excess of 10,000.

3. A process according to claim 1, wherein after the condensed solvent is separated by decantation from condensed steam, the residue of material and polymer is removed, new solvent is added, and the steps of the process are repeated.

4. A process according to claim 1, wherein after removal of the products and waste, the process is repeated with fresh solvent mixture.

5. A process according to claim 1, wherein the solvent is methylene chloride.

6. A process according to claim 1, wherein the solvent is methyl chloroform.

7. A process according to claim 1, wherein the solvent is trichloroethylene.

References Cited
UNITED STATES PATENTS

| | | | |
|---|---|---|---|
| 2,457,238 | 12/1948 | Hunter et al. | 260—94 |
| 3,005,812 | 10/1961 | Wohlers | 260—94.9 H |
| 3,483,092 | 12/1969 | Young | 203—2 X |

NORMAN YUDKOFF, Primary Examiner

J. SOFER, Assistant Examiner

U.S. Cl. X.R.

202—185, 204, 206, 234; 203—DIG. 7; 159—16 S; 260—96